United States Patent
Majed et al.

(10) Patent No.: US 11,204,751 B2
(45) Date of Patent: Dec. 21, 2021

(54) MITIGATING INCOMPATIBILITIES DUE TO CODE UPDATES IN A SYSTEM CONTAINING MULTIPLE NETWORKED ELECTRONIC CONTROL UNITS

(71) Applicant: International Business Machines Corporation, Armonk, NY (US)

(72) Inventors: Naghmana Majed, Dallas, TX (US); Jenny S. Li, Cary, NC (US); Elezaveta Koumpan, Ontario (CA); Gopal Indurkhya, Charlotte, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/125,417

(22) Filed: Sep. 7, 2018

(65) Prior Publication Data
US 2020/0081699 A1    Mar. 12, 2020

(51) Int. Cl.
*G06F 8/65* (2018.01)
*H04L 9/06* (2006.01)
(Continued)

(52) U.S. Cl.
CPC .............. *G06F 8/65* (2013.01); *H04L 9/0637* (2013.01); *G06F 21/572* (2013.01);
(Continued)

(58) Field of Classification Search
CPC .......... G06F 8/65; G06F 21/44; G06F 21/572; H04L 9/0637; H04L 9/3239; H04L 63/08;
(Continued)

(56) References Cited

U.S. PATENT DOCUMENTS 9,875,510 B1    1/2018 Kasper
9,875,592 B1    1/2018 Erickson et al.
(Continued)

FOREIGN PATENT DOCUMENTS

WO    2018020375 A1    2/2018
WO    2018020377 A1    2/2018

OTHER PUBLICATIONS

Cube et al.; "Autonomous Car Network Security Platform Based on Blockchain", CUBE Intelligence Incorporation, Nov. 16, 2017, pp. 1-28.
(Continued)

*Primary Examiner* — Wei Y Zhen
*Assistant Examiner* — Mohammed N Huda

(57) ABSTRACT

An example operation may include one or more of receiving, by a validator node, candidate update code for installation on one of multiple networked ECUs of a vehicle as a target node, identifying one or more other ECUs on the network that communicate with the target node as impacted nodes, checking for known adverse conditions between the candidate update code and existing code of the impacted nodes, in the case an adverse condition is identified, preventing the update code from being installed on the target node, in the case no adverse condition is identified, and no adverse condition is identified by any peer validator node, allowing the update code to be installed on the target node, forming, by the validator node, a block containing information of the candidate update code and its installation disposition, and appending the block to a blockchain utilized by at least one of the peer validator nodes.

20 Claims, 8 Drawing Sheets

(51) Int. Cl.
  *G06F 21/57* (2013.01)
  *H04L 29/06* (2006.01)
  *H04L 9/32* (2006.01)

(52) U.S. Cl.
  CPC ........ *H04L 9/3239* (2013.01); *H04L 63/1425* (2013.01); *H04L 2209/38* (2013.01); *H04L 2209/84* (2013.01)

(58) Field of Classification Search
  CPC . H04L 63/10; H04L 63/1425; H04L 2209/38; H04L 2209/84
  USPC ........................................................ 717/172
  See application file for complete search history.

(56) References Cited

U.S. PATENT DOCUMENTS

| | | | | |
|---|---|---|---|---|
| 2015/0242198 | A1* | 8/2015 | Tobolski et al. | G06F 8/65 717/172 |
| 2016/0170775 | A1* | 6/2016 | Rockwell et al. | G06F 8/65 713/100 |
| 2017/0046693 | A1 | 2/2017 | Haldenby et al. | |
| 2017/0134161 | A1 | 5/2017 | Goeringer et al. | |
| 2017/0322791 | A1* | 11/2017 | Tiles | G06F 8/65 |
| 2017/0344988 | A1 | 11/2017 | Cusden et al. | |
| 2017/0358041 | A1 | 12/2017 | Forbes, Jr. et al. | |
| 2017/0359288 | A1 | 12/2017 | Golan | |
| 2018/0018723 | A1 | 1/2018 | Nagla et al. | |
| 2018/0039667 | A1 | 2/2018 | Pierce et al. | |
| 2018/0054491 | A1 | 2/2018 | Mankovskii et al. | |
| 2019/0042726 | A1* | 2/2019 | Unagami et al. | H04L 9/0637 |
| 2019/0097807 | A1* | 3/2019 | Mahanta et al. | H04L 9/0637 |
| 2020/0007342 | A1* | 1/2020 | Liem et al. | H04L 9/0637 |

OTHER PUBLICATIONS

Dorri et al.; "Blockchain: A Distributed Solution to Automotive Security and Privacy", IEEE Communications Magazine, vol. 55, Issue 12, Dec. 2017, pp. 119-125.

Singh, Madhusudan; "Blockchain Based Secure Decentralized Vehicle Communication", IEEE SecDev Conference on, Yonsei University, Songdo, South Korea, 2017, pp. 1-6.

Steger et al.; "Secure Wireless Automotive Software Upadtes Using Blockchains—A Proof of Concept", Jul. 27, 2017, pp. 1-12.

* cited by examiner

400

600

MITIGATING INCOMPATIBILITIES DUE TO CODE UPDATES IN A SYSTEM CONTAINING MULTIPLE NETWORKED ELECTRONIC CONTROL UNITS

TECHNICAL FIELD

This application generally relates to vehicle software updates, and more particularly relates to mitigating incompatibilities due to code updates in a system containing multiple networked electronic control units.

BACKGROUND

Cars and other vehicles often contain a plurality of devices and systems governed by software, or that have a software or firmware aspect to their operation. Over the air (OTA) technology is being used by automotive manufacturers for software update over the air (SOTA) or firmware update over the air (FOTA). In the not-too-distant future, such updates are expected to be used to make ongoing improvements to many digitally controlled systems over the life of the vehicle. Since about 2015, original equipment manufacturers (OEMs) have been using OTA updates for infotainment and telematics, and more recently by powertrain functions. However, by 2025, it is anticipated that OTA downloads will be used to upgrade software and firmware for many more aspects of vehicle operation and performance. For example, aspects of vehicles that are expected to make use of computer-readable instructions include the power train, transmission, gauges and meters, lighting and signaling, sensors, audio/video devices, wiring, electrical switches, braking system, exhaust system, engine, suspension and steering, chassis and body, cabin environmental controls, safety and security services, and more.

OTA updates are known to have inherent challenges attributable to the increasing complexity of vehicles. For example, a vehicle may contain dozens of electronic control units (ECUs), each of which may use software and/or firmware code, such as computer-readable instructions, that may be improved or enhanced with newly developed code. In general, the ECUs and associated software and firmware are provided by multiple suppliers. Some of the challenges likely to be encountered have to do with possible inconsistencies and incompatibilities between OTA-delivered updates for all of the different ECUs and subsystems in a vehicle. Other challenges include the potential injection of malware during the OTA download of computer-readable instructions to a vehicle, and other safety and security threats that may be encountered.

A blockchain is a technology that was developed as a way of providing a transparent and decentralized ledger that tracks and stores digital transactions in a verifiable, secure manner to prevent tampering or revision. A typical blockchain includes three primary functions: read, write, and validate. An authorized user node on the network implementing the blockchain needs to be able to read the data that resides in the blockchain. The user also needs to be able to write (append) data to the blockchain. And, every write operation starts out as a proposed transaction that is posted on the blockchain network to be checked by the other user nodes on the network to ensure the proposed transaction is valid. For example, it may contain syntax errors, or it may embody an attempt to perform an improper task, such as a task the submitter is not authorized to perform. The validation process filters out invalid transactions, and if there are multiple valid transactions, determines the order in which they are written in a new block to be appended to the blockchain.

Once the validated transactions are packaged in a new block, the new block must also be approved by at least a threshold number of validator nodes before it is appended to the chain. Each block that is appended to the chain, including the genesis (first) block, contains a hash of its contents, and every block after the first also contains the hash of the previous block. Once a block has been appended to the blockchain, it cannot be altered without changing the hash of its contents, which makes the change detectable.

Blockchain technology was first used in crypto currencies. More recently, blockchain technology has been applied to many other entities and types of transactions, and also provides a framework for the execution of smart contracts. Smart contracts are self executing agreements between parties that have all of the relevant terms and covenants defined in executable code. The code is executed automatically, depending on future signatures or trigger events, to satisfy the terms of the contract. Once a smart contract is appended to the blockchain, it cannot be modified, revoked, denied, or reversed in any respect without the consensus of most or all of the blockchain nodes. It is the decentralized operation of the blockchain that prevents control or modification of any aspect of the chain by a single party.

SUMMARY

One example embodiment may provide a method that includes one or more of receiving, by a validator node, candidate update code for installation on one of multiple networked ECUs of a vehicle as a target node, identifying one or more other ECUs on the network that communicate with the target node as impacted nodes, checking for known adverse conditions between the candidate update code and existing code of the impacted nodes, in the case an adverse condition is identified, preventing the update code from being installed on the target node, in the case no adverse condition is identified, and no adverse condition is identified by any peer validator node, allowing the update code to be installed on the target node, forming, by the validator node, a block containing information of the candidate update code and its installation disposition, and appending the block to a blockchain utilized by at least one of the peer validator nodes.

Another example embodiment may provide a system, comprising a processor, memory accessible to the processor, and computer program instructions stored in the memory and executable by the processor to perform one or more of receive, by a validator node, candidate update code for installation on one of multiple networked ECUs of a vehicle as a target node, identify one or more other ECUs on the network that communicate with the target node as impacted nodes, check for known adverse conditions between the candidate update code and existing code of the impacted nodes, in the case an adverse condition is identified, prevent the update code from being installed on the target node, in the case no adverse condition is identified, and no adverse condition is identified by any peer validator node, allow the update code to be installed on the target node, form, by the validator node, a block that contains information of the candidate update code and its installation disposition, and append the block to a blockchain utilized by at least one of the peer validator nodes.

A non-transitory computer readable medium comprising computer readable instructions, the instructions executable by a computer processor to perform one or more of receiving, by a validator node, candidate update code for installation on one of multiple networked ECUs of a vehicle as a target node, identifying one or more other ECUs on the network that communicate with the target node as impacted nodes, checking for known adverse conditions between the candidate update code and existing code of the impacted nodes, in the case an adverse condition is identified, preventing the update code from being installed on the target node, in the case no adverse condition is identified, and no adverse condition is identified by any peer validator node, allowing the update code to be installed on the target node, forming, by the validator node, a block containing information of the candidate update code and its installation disposition, and appending the block to a blockchain utilized by at least one of the peer validator nodes.

BRIEF DESCRIPTION OF THE DRAWINGS

The details of the present disclosure, with regard to its structure, function, and operation, can be better understood by referring to the accompanying drawings, in which like reference numbers and designations refer to like elements. The drawings illustrate disclosed embodiments and/or aspects and, together with the description, serve to explain the principles of the application, the scope of which is determined by the claims.

In the drawings.

DETAILED DESCRIPTION

Figure 1:
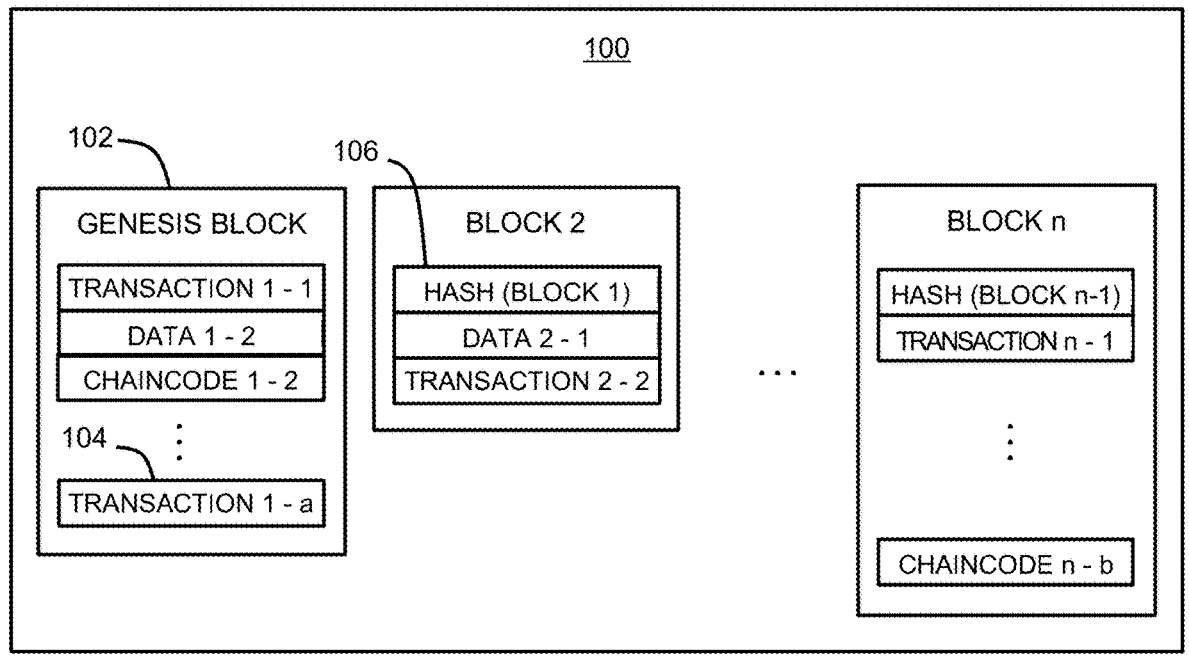
FIG. 1 is a diagram illustrating a blockchain, in accordance with the disclosure

It is to be understood that the figures and descriptions provided herein may have been simplified to illustrate aspects that are relevant for a clear understanding of the herein described processes, machines, manufactures, and/or compositions of matter, while eliminating, for the purpose of clarity, other aspects that may be found in typical devices, systems, and methods. Those of ordinary skill in the pertinent art may recognize that other elements and/or steps may be desirable and/or necessary to implement the devices, systems, and methods described herein. Because such elements and steps are well known in the art, and because they do not facilitate a better understanding of the present disclosure, a discussion of such elements and steps may not be provided herein. However, the present disclosure is deemed to inherently include all such elements, variations, and modifications to the described aspects that would be known to those of ordinary skill in the pertinent art.

It will be readily understood that the components of the present application, as generally described and illustrated in the figures herein, may be arranged and designed in a wide variety of different configurations. Thus, the following detailed description of the embodiments of a method, apparatus, and system, as represented in the attached figures, is not intended to limit the scope of the application as claimed, but is merely representative of selected embodiments of the application.

The features, structures, or characteristics of the application described throughout this specification may be combined in any suitable manner in one or more embodiments. For example, the usage of the phrases "exemplary embodiments", "embodiments", "aspects", or other similar language, throughout this specification refers to the fact that a particular described feature, structure, or characteristic may be included in at least one embodiment of the present application. Thus, the appearance of references to embodiments and aspects throughout this specification do not necessarily all refer to the same group of embodiments, and the described features, structures, or characteristics may be combined in any suitable manner in one or more embodiments. In addition, the term "message" may also include packet, frame, datagram, and the like. The application is not limited to a certain type of message or a certain type of signaling.

A variety of embodiments and aspects will now be described. These are provided as teaching examples, and should not be interpreted to limit the scope of the application. Although specific details of the embodiments are presented, these embodiments may be modified by changing, supplementing, or eliminating many of these details.

A controller area network (CAN) is a message-based networking standard that allows microcontrollers and ECUs in vehicles to communicate with each other without a host computer. The disclosure describes a CAN that uses blockchain technology to enhance the safety and security of updates to software, firmware, and data used by the ECUs that are received over the air (OTA) by a vehicle.

With reference now to FIG. 1, a blockchain 100 includes a plurality of blocks 102. Each block 102 is a data structure that includes data representing transactions, data, chaincode, or the like (collectively, transactions) 104. For example, smart contracts, payment receipts, identifiers, or any other transaction. As one or more new transactions 104 are submitted to be appended to the blockchain 100, they are validated, and an additional block 102 is generated containing the transactions, and is appended to the blockchain 100. Each new block 102 also includes a hash 106 of the immediately previous block 102. For example, block 2 includes a hash of the genesis block, block n includes a hash of block n−1, etc. In embodiments, blockchain 100 may include or be associated with one or more updates to software or firmware delivered to a vehicle OTA, as will be described hereinafter.

Figure 2:
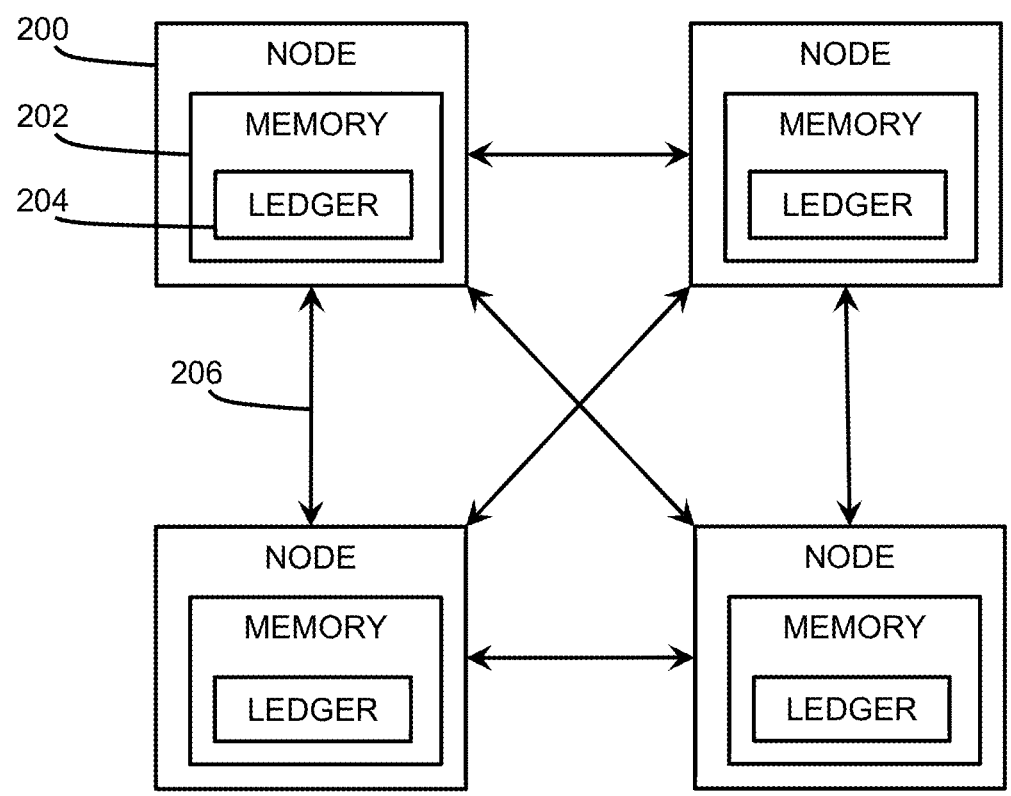
FIG. 2 is a diagram illustrating nodes of a network associated with the blockchain of FIG. 1, in which the blockchain of FIG. 1 is stored in a ledger on each node, in accordance with the disclosure.

With reference to FIG. 2, a network of nodes 201, blockchain 100 is stored in a decentralized manner on a plurality of nodes 200, e.g., computing devices located in subsystems of a vehicle. Nodes 200 may each include a memory 202 that stores at least a portion of a ledger 204 of blockchain 100. Ledger 204 includes any blocks 102 that have been validated and added to the blockchain 100. In embodiments, every node 200 may store the entire ledger 204. Nodes 200 may communicate with one another via communication pathways 206, e.g., wired or wireless connections, to transmit and receive data related to ledger 204. For example, as new blocks 102 are added to ledger 204, nodes 200 may communicate or share the new data blocks 102 via communication pathways 206.

Figure 3:
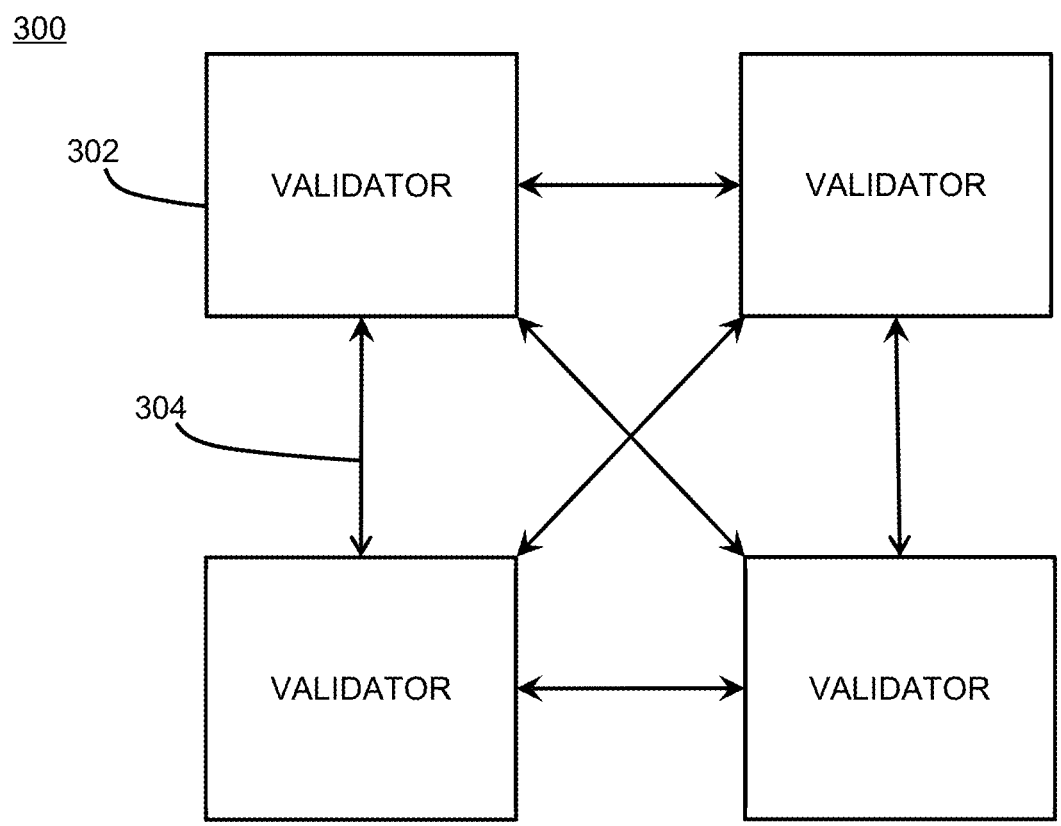
FIG. 3 is a diagram illustrating validator peer nodes associated with the network of FIG. 2, in accordance with the disclosure.

Referring now to FIG. 3, any transactions 104 submitted to blockchain 100 are validated by a set 300 of validator nodes 302 associated with blockchain 100. For example, transactions 104 may be transmitted to one or more of the validator nodes 302 and may be shared between the validator nodes 302 for validation and consensus. Each validator node 302 determines whether a transaction 104 is valid and whether the transaction 104 complies with the rules of the blockchain 100. In one aspect, a validator node 302 adds one or more validated transactions 104 to a block 102 and submits the block 102 for consensus by some or all of the other validator nodes. The other validator nodes 302 then perform their own respective validation procedures to approve or disapprove appending the data block 102 containing the transactions 104 to the blockchain 100. A consensus of the set of validator nodes 300 is required to allow or deny the data block 102 to be appended to the blockchain 100. Some or all of nodes 200 may also be validator nodes 302. In some aspects, nodes 200 that are not validator nodes 302 may perform processing such as, for example, receiving OTA proposed software upgrades, sending the proposed upgrades to at least one validator node 302, installing upgrades approved by the set of validator nodes 300, or other similar functions. In this manner, resources of the validator nodes 302 may be reserved for generating new blocks, reaching consensus, and monitoring other nodes 200 and validator nodes 302. Validator nodes 302 may communicate with one another via communication pathways 304, such as wired or wireless connections, to transmit and receive data. For example, as new data blocks 102 are generated by validator nodes 302, the validator nodes 302 may communicate or share the new data blocks 102 and transmit and receive consensus messages via communication pathways 304.

Figure 4:
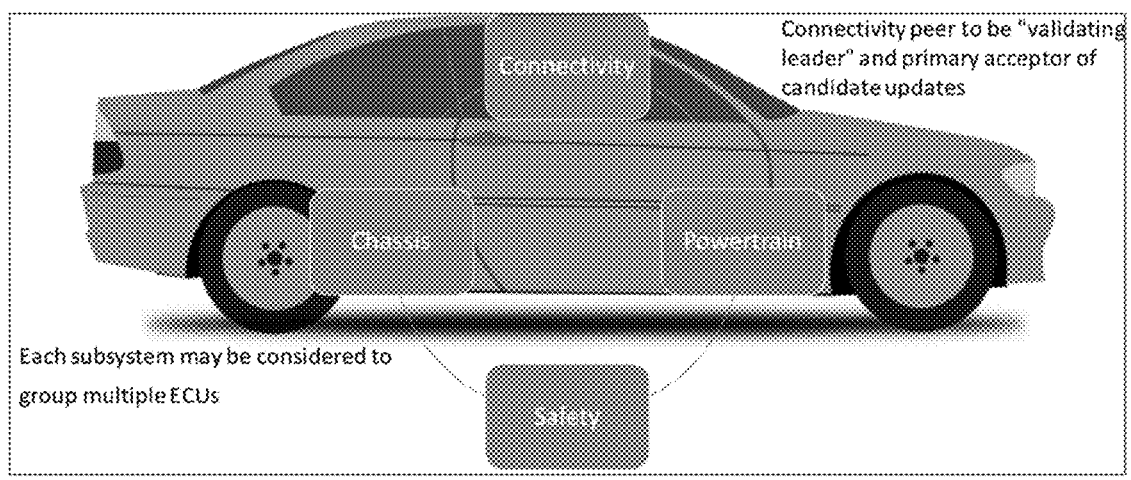
FIG. 4 illustrates a network comprising four subsystems, each of which contains a validator peer node, in accordance with the disclosure. Each subsystem may be considered to contain multiples ECUs.
Figure 5:
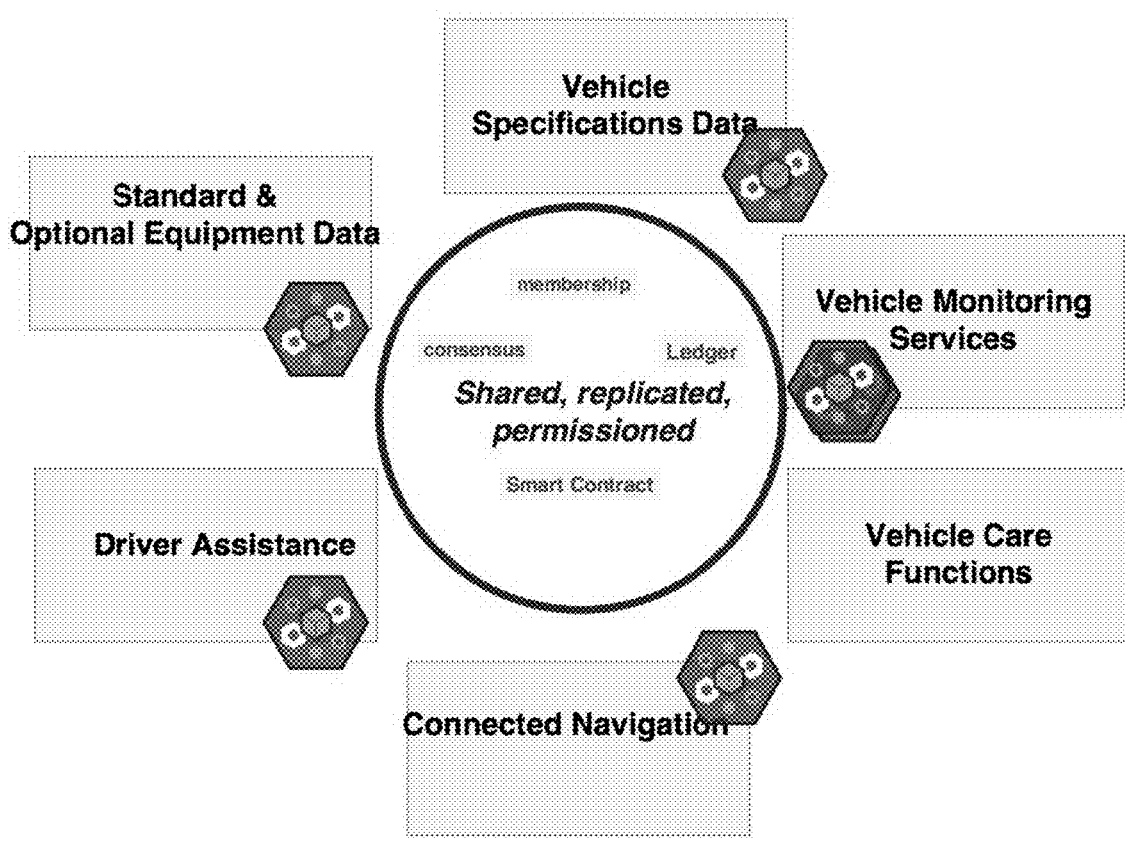
FIG. 5 is a block diagram illustrating a plurality of computerized subsystems that may be provided by a vehicle, suitable for use with blockchain.
Figure 6:
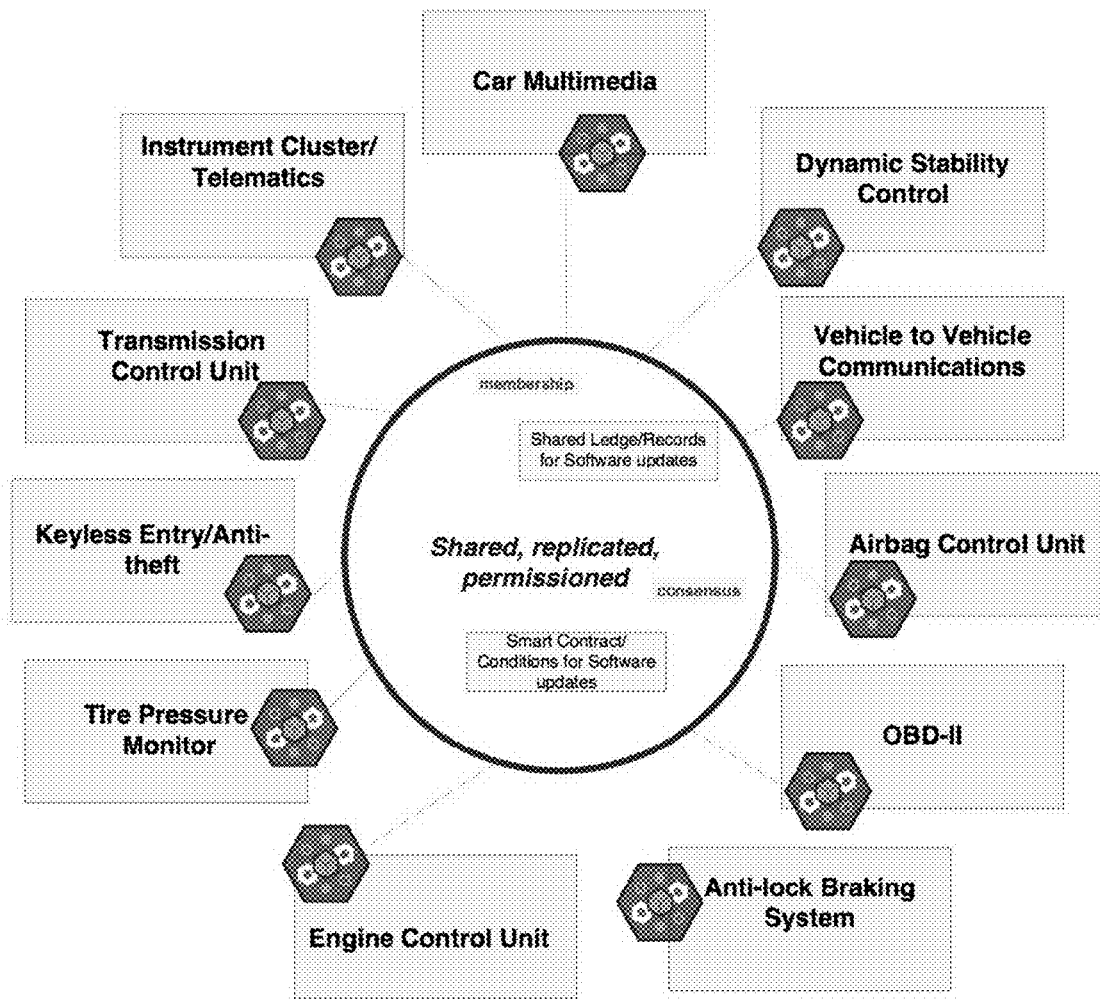
FIG. 6 is a block diagram illustrating the growing number of ECUs as nodes containing software or firmware subject to being updated.

FIG. 4 illustrates a network 400 with aspects of an exemplary embodiment, showing four important subsystems of a vehicle, each of which contains one or more ECUs that are or will soon be subject to OTA updates, including the connectivity, chassis, safety, and powertrain subsystems. In the foreseeable future, the ECUs of more and more subsystems are expected to be subject to such updates. FIG. 5 illustrates a first added group of such subsystems 500 which may be added relatively near term, including vehicle specifications data, vehicle monitoring services, vehicle care functions, connected navigation, driver assistance, and standard and optional equipment data. FIG. 6 illustrates a second, even larger added group of such subsystems 600, which may be added relatively longer term. The subsystems shown in FIGS. 4, 5, and 6 are illustrative of the growing number of subsystems being digitized (i.e., "modernized" to operate using digital data) at an accelerating pace.

Each of the subsystems contains one or more ECUs. In embodiments, the ECUs of all of the subsystems may be configured as members of a single CAN. Each ECU may also be configured as a validator peer node 302, in a network of peer validator nodes. The network of validator nodes use blockchain in connection with updating ECU software, firmware, data, and the like. Each validator node 302 ECU that communicates with the ECU that has a pending candidate update (the target ECU) may evaluate the candidate update. To do so, the validator node 302 checks for compatibility information regarding the effect the candidate upgrade may have on the validating node's ECU (the impacted ECU). To do so, the validating node may access one or more databases containing information of known incompatibilities, and/or information that testing was performed and did not reveal any incompatibilities. Such a database may be located within a validator node or elsewhere within the vehicle, or may be remotely located, for example, in association with the manufacturer of one or more of the vehicle, the subsystem, the target ECU, and the impacted ECU. Alternatively or in addition, the validator node may contact at least one likely source of compatibility information for its ECU, such as the ECU manufacturer, vendor, and/or other compatibility testing entity. To do so, the validator node may use uniform resource location (URL) addresses, which may be stored, for example, in the validator node 302. Alternatively or in addition, the URLs may be stored in any other location accessible to the validator node.

In embodiments, the ECUs of one or more of the subsystems may be configured as members of different respective CANs. In this case, each subsystem may also contain its own validator peer node 302 that is the primary acceptor of candidate updates with regard to ECUs in the subsystem. In embodiments, the validator nodes of all of the subsystems are also configured as a network of peer validator nodes. The network of validator nodes uses blockchain in connection with updating ECU software, firmware, data, and the like. Each validator node 302 evaluates candidate updates directed to any of the ECUs in its subsystem. To do so, the validator node 302 checks for compatibility information regarding the effect the candidate upgrade may have on the other ECUs of the same subsystem. To do so, the validating node may access one or more databases containing information of known incompatibilities, and information that testing was performed and did not reveal any incompatibilities. Such a database may be located within a validator node or elsewhere within the vehicle, or may be remotely located, for example, in association with the manufacturer of the vehicle. Alternatively or in addition, the validator node may contact at least one likely source of compatibility information for each of the ECUs in its subsystem, such as the ECU manufacturer, vendor, and/or other compatibility testing entity. To do so, the validator node may use uniform resource location (URL) addresses, which may be stored, for example, in the validator node 302 in association with corresponding identifiers of the ECUs of the subsystem. Alternatively or in addition, the URLs may be stored in any other location accessible to the validator node.

If the validator search locates information indicating there is an incompatibility or other adverse condition associated with the update, the update is not installed. However, if the search locates information indicating the candidate update has been tested and found to be compatible with the other software and firmware of ECUs in the subsystem, the validator node 302 initiates the update. In the case no compatibility information is found, the validator node itself may determine whether to install the update. For example, the validator node may be configured to install such an update by default, or the default may be to not install the update. Alternatively, one or more rules may be invoked by the validator node to make the determination. In any case, the validator node 302 forms a new block containing information of the update candidate and whether it was installed, and appends it to the blockchain.

In embodiments, in the case an incompatibility is identified the validator node may search again for information of a remedy, such as an upgrade to the incompatible ECU's software/firmware. If so, the validator node may repeat the validating procedure in connection with the identified remedial update. Depending on the result, both the candidate update and the remedial update may be installed, and information of both updates may be included in a block and appended to the blockchain.

As noted, the validator nodes 302 are all configured as part of a network that uses blockchain technology. Each subsystem's validating peer node 302 runs a copy of the same chaincode, and so they behave similarly with regard to the ECUs in their respective subsystem. The ECU nodes of each subsystem may be configured as a respective control area network (CAN). Each subsystem's validating node 302 monitors the CAN for new updates directed to the ECUs in its subsystem. Further, each validating peer node 302 stores or has access to reference data and/or logic relevant to the ECUs in its subsystem, which may be obtained from one or more host URLs for each ECU, as described previously.

As shown in FIG. 4, a vehicle's subsystems containing ECUs subject to OTA updates may include, for example, power train, transmission, chassis, and safety subsystems. The validating node network uses blockchain technology to notify the other validating nodes when an update has been allowed to install. That is, the validating node forms a new block containing information of the upgrade, and the block is appended to the blockchain. The other subsystems can then validate the consistency of the update from the viewpoint of at least the following aspects—is there a need to update a certain node? If the node is updated, is it going to have an adverse effect on any other node? And, is the update going to present a new threat to the car or its passengers? In addition, incoming OTA updates can be examined for injected malware or other inappropriate contents, and if any are found may prevent the update from being installed.

If a node of a first subsystem is being updated, it may be determined if any of the ECUs in the other subsystems need to be updated responsive to the allowed update. For example, one or more ECUs of at least two different subsystems may communicate during their regular operation. If so, the effect of an installed update in one subsystem should be evaluated with respect to the ECUs of the other subsystems that may be impacted. That evaluation may be performed, for example, by the other subsystems' respective validating nodes 302. In embodiments, the evaluation of potentially impacted nodes may be performed before the update is installed. In other embodiments, the evaluation may be performed after the update is installed.

When there is consensus among all of the subsystems of the vehicle that no incompatibility will arise for an incoming software/firmware update (or, at least confirming there is no known incompatibility), the update may be allowed to proceed.

This procedure enables the assessment of a candidate software/firmware update of a target ECU prior to the actual update. Requests can be sent to third party software vendors for assessment of incompatibilities between the target ECU and potentially impacted ECUs. Consensus must be reached among the potentially impacted components before an update to the software/firmware of a target component is permitted. In addition, the disclosed embodiments establish a confirmation and tracking mechanism for ECU updates, and the software/firmware update status among impacted components.

In embodiments, a block chain architecture is established among all major vehicle subsystems and their components such as power train, transmission, gauges and meters, lighting and signaling, sensors, audio/video devices, wiring, electrical switches, braking system, exhaust system, engine, suspension and steering, and more. Depending on how sophisticated or advanced a vehicle is, many of these components may be digitally controlled by software/firmware. A candidate update to the software/firmware of a component should be fully assessed before the update is deployed.

In embodiments, each subsystem may contain a component that can act as an authorized party in a block chain. All of the subsystems containing elements potentially impacted by a candidate update to code of a target node should come to a consensus regarding whether the candidate code should be deployed to the target component based on the impact assessment. Each component, or an intermediate component of each potentially impacted subsystem, may reach out to the component's software/firmware provider, which could be an external third party, to request a compatibility assessment. If the impacted component is unable to assess the impact itself, the third party may be able to provide information regarding whether an updated version of a target component's code may adversely affect the existing code of the impacted component or not.

Once approved by all impacted components, the new code of the target component may be deployed. In addition, one or more of the potentially affected components may determine if any changes to its own code or configuration may be appropriate in view of the new update on the target component. When each of the affected components has finished making its adjustments, it can provide a confirmation to other nodes that it has modified its code or configuration. The transaction can then be moved forward to the next affected component until all affected components have declared completion.

In embodiments, each element of a vehicle that operates using code or digital data is assigned a universally unique identifier (UUID). The UUID will be unique across all subsystems and services. All UUIDs are added to the shared compliance ledger, where data about software/firmware updates will be stored. When a UUID is generated for such an element that uses code or digital data, all of that element's dependencies and supplier details are captured. When a new candidate update is received OTA for a supported capability, the validator node of the CAN to which the update target is coupled will send a peer-to-peer request to the other validator nodes of the other CANs about the software/firmware update. When the consensus is reached, i.e., network participants agree to allow the update, the update will proceed. Information of the update is added to a new block, which is added to the blockchain. An audit history of all updates will be preserved in the blockchain.

Figure 7:
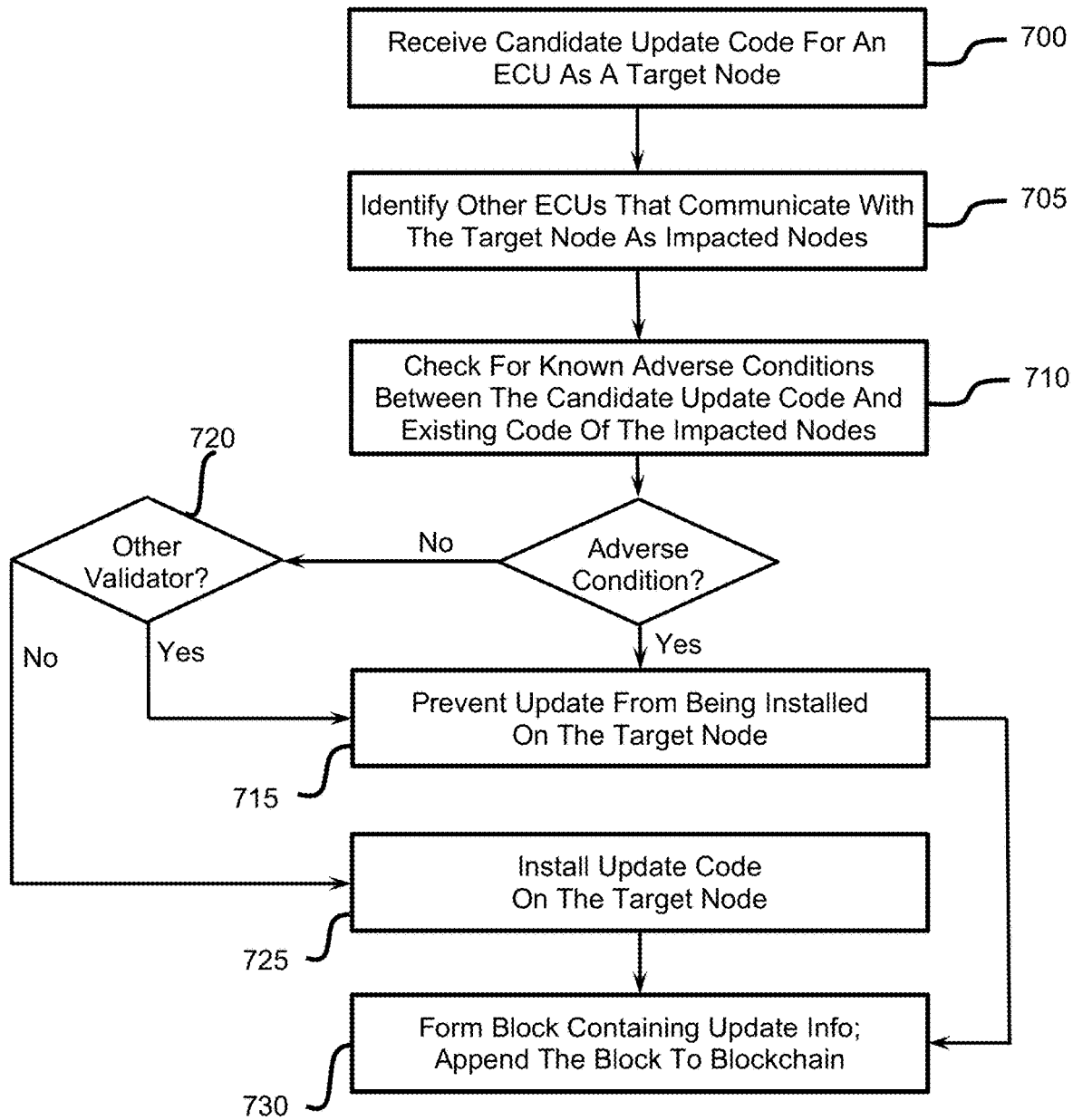
FIG. 7 is a flow diagram of a method of checking vehicle software, firmware, and data updates received via OTA for compatibility issues with existing software, firmware, and data before the update is permitted to proceed.

FIG. 7 is a flow diagram 701 of an exemplary method of providing upgrades to digital code in a system containing multiple networked electronic control units as nodes on a network. The method begins when a validator node receives candidate update code for installation on one of multiple networked ECUs as a target node, 700. Any other ECUs on the network that communicate with the target node are identified as impacted nodes, 705. The validator node checks for known adverse conditions between the candidate update code and existing code of the impacted nodes, 710. If an adverse condition is identified, the update code is prevented from being installed on the target node, 715. However, in the case no adverse condition is identified, the validator node checks if any adverse conditions were identified by peer validator nodes, 720. If an adverse condition is identified by another validator node, the update code is prevented from being installed on the target node, 715. If no adverse condition is identified by any peer validator node, a consensus is reached and the update code is installed on the target node, 725. The validator node forms a block containing information of the candidate update code and its installation disposition; and appends the block to a blockchain 730 implemented on a network of peer validator nodes that use a blockchain.

The disclosed embodiments may be implemented in hardware, in a computer program executed by a processor, in firmware, or a combination of these. A computer program may be stored on a tangible computer readable storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to a processor such that the processor may read information from, and write information to, the storage medium. In embodiments, the storage medium may be integral to the processor. In embodiments, the processor and the storage medium may reside in an application specific integrated circuit ("ASIC").

Figure 8:
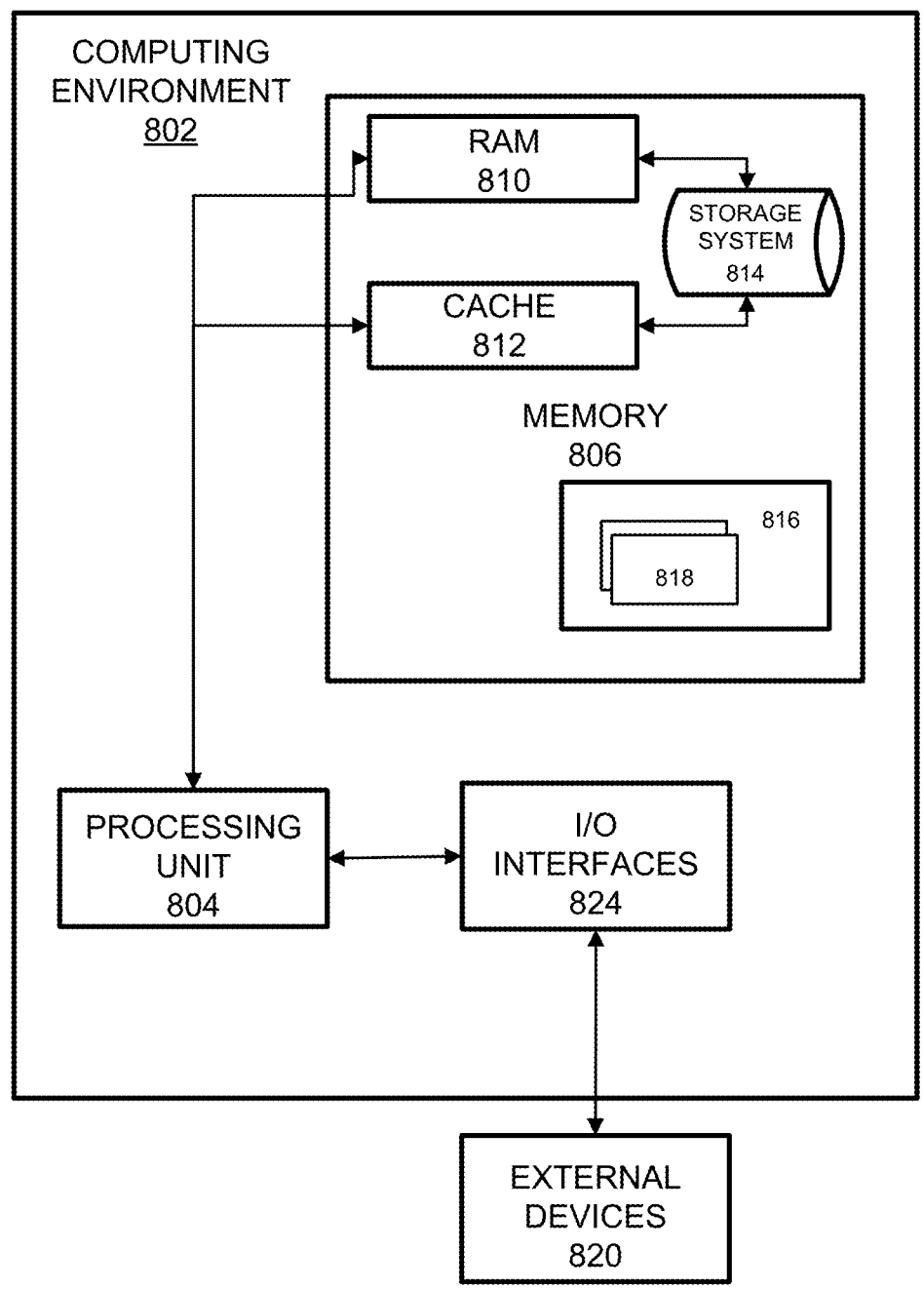
FIG. 8 is an exemplary block diagram of a computing environment in which aspects of the system, method, and computer program product described herein may be realized.

FIG. 8 illustrates an example computing environment architecture 800, with which aspects of the disclosure may be realized. FIG. 8 is not limiting as to the scope of use or functionality of the embodiments described herein. Rather, computing environment 800 is simply an example computing environment. Those of skill in the art will recognize many other configurations and elements may alternatively or additionally be used to realize various aspects of the described embodiments. Computing environment 802 may include, but is not limited to, one or more processors or processing units 804, a system memory 806, and a bus that couples various components together, for example coupling system memory 806 to processor 804.

Computing environment 802 may include a variety of computer readable media, such as volatile and non-volatile media, programmable memory, and the like. For example, system memory 806 can include computer system readable media in the form of volatile memory, such as random-access memory (RAM) 810 and/or cache memory 812. Computing environment 802 may further include other removable/non-removable, volatile/non-volatile computer system storage media. By way of example only, storage system 814 may be provided for reading from and writing to a non-removable, non-volatile magnetic media. As will be further depicted and described below, memory 806 may contain at least one program 816 comprising a set of program modules 818 that are configured to carry out the functions of various embodiments described. Data storage media may also contain an operating system, one or more application programs, other program modules, program data, and the like.

As will be appreciated by one skilled in the art, aspects of the present disclosure may be embodied as a system, method, or computer program product. Accordingly, aspects of the present application may take the form of an entirely hardware embodiment, or an embodiment combining software elements (including firmware, resident software, micro-code, etc.) stored and executed on hardware that may generally be referred to as a "circuit," "module" or "system." Furthermore, aspects of the present application may take the form of a computer program product embodied in a computer readable medium having computer readable program code embodied thereon.

Computing environment 802 may also communicate with one or more external devices 820. Via one or more input/output (I/O) interfaces 824. Such devices may include an antenna for receiving OTA updates, and for sending and receiving various messages. I/O interfaces 824 may also include one or more network interfaces to allow computing environment 802 to communicate with other computing devices on one or more networks. For example, one interface may be provided in a validator node 302 for communicating over a CAN with ECUs in its subsystem, and another interface for communicating over another network as a peer with other peer validator nodes.

Although exemplary embodiments of at least one system, method, and non-transitory computer readable medium have been illustrated in the drawings and described in the foregoing detailed description, it will be understood that the application is not limited to the embodiments disclosed, but is capable of numerous rearrangements, modifications, and substitutions. For example, the methods, systems, and apparatuses disclosed herein may be implemented in localized or distributed forms consistent with computing technology.

Although the application has been described and illustrated in exemplary forms with a certain degree of particularity, it is noted that the description and illustrations have been made by way of example only. Numerous changes in the details of construction, combination, and arrangement of parts and steps may be made without deviating from the scope of the application. Accordingly, such changes are understood to be inherent in the disclosure. The application is not limited except by the appended claims and the elements explicitly recited therein. The scope of the claims should be construed as broadly as the prior art will permit. It should also be noted that all elements of all of the claims may be combined with each other in any possible combination, even if the combinations have not been expressly claimed.

What is claimed is:

1. A method, comprising:
receiving, by a validator node, candidate update code for installation on a target electronic control unit (ECU) on a network of a vehicle;
identifying other ECUs on the network that communicate with the target ECU as impacted ECUs;
determining that the candidate update code is compatible with existing code of the impacted ECUs based on consensus messages received from the plurality of impacted ECUs;
in response to the determination that the candidate update code is compatible with the impacted ECUs, allowing the candidate update code to be installed on the target ECU;
forming, by the validator node, a block containing information of the candidate update code and its installation disposition; and
appending the block to a blockchain utilized by one or more peer validator nodes.

2. The method of claim 1, wherein:
the impacted ECUs and the validator node are all nodes of a controller area network (CAN) of a vehicle; and the CAN is one of multiple CANs, each CAN pertaining to a different vehicle subsystem and containing its own validator node and multiple ECUs pertaining to that subsystem as nodes on that CAN.

3. The method of claim 2, further comprising:
assigning a universally unique identifier (UUID) to each of the ECUs in each of the CANs;
capturing, as ECU information, the dependencies and supplier details of each of the ECUs in each of the CANs; and
adding the UUID of each of the ECUs, in association with the corresponding ECU information, to the shared compliance ledger in a block of the blockchain.

4. The method of claim 1, further comprising:
checking for known adverse conditions from a supplier of the target ECU using a respective uniform resource locator (URL) of the supplier which is stored in the blockchain.

5. The method of claim 1, further comprising:
storing the consensus decision in the blockchain.

6. The method of claim 1, further comprising:
forming, by the validator node, a block containing information of the impacted ECUs; and
appending the block to the blockchain.

7. The method of claim 6, further comprising:
for each identified impacted ECU, determining if the impacted ECU should be updated responsive to the allowed update, and in the case the code should be updated, obtaining candidate update code for the impacted ECU as a second target node.

8. A system comprising:
a processor configured to:
receive, by a validator node, candidate update code for installation on a target electronic control unit (ECU) on a network of a vehicle;
identify other ECUs on the network that communicate with the target ECU as impacted ECUs;
determine that the candidate update code is compatible with existing code of the impacted ECUs based on consensus messages received from the plurality of impacted ECUs;
in response to the determination that the candidate update code is compatible with the impacted ECUs, allow the candidate update code to be installed on the target ECU;
form, by the validator node, a block that contains information of the candidate update code and its installation disposition; and
append the block to a blockchain utilized by one or more peer validator nodes.

9. The system of claim 8, wherein:
the impacted ECUs and the validator node are all nodes of a controller area network (CAN) of a vehicle; and
the CAN is one of multiple CANs, each CAN pertains to a different vehicle subsystem and contains its own validator node and multiple ECUs pertain to that subsystem as nodes on that CAN.

10. The system of claim 9, wherein the processor is further configured to:
assign a universally unique identifier (UUID) to each of the ECUs in each of the CANs;
capture, as ECU information, the dependencies and supplier details of each of the ECUs in each of the CANs; and
add the UUID of each of the ECUs, in association with the ECU information that corresponds to the shared compliance ledger in a block of the blockchain.

11. The system of claim 8, wherein the processor is further configured to:
check for known adverse conditions from a supplier of the target ECU based on a respective uniform resource locator (URL) of the supplier which is stored in the blockchain.

12. The system of claim 8, wherein the processor is further configured to:
storing the consensus decision in the blockchain.

13. The system of claim 8, wherein the processor is further configured to:
form, by the validator node, a block that contains information of the impacted ECUs; and
append the block to the blockchain.

14. The system of claim 13, wherein the processor is further configured to:
for each identified impacted ECU, determine if the impacted ECU should be updated responsive to the allowed update, and in the case the code should be updated, obtain candidate update code for the impacted ECU as a second target node.

15. A non-transitory computer readable medium comprising instructions which when executed by a processor cause a computer to perform a method comprising:
receiving, by a validator node, candidate update code for installation on a target electronic control unit (ECU) on a network of a vehicle;
identifying other ECUs on the network that communicate with the target ECU as impacted ECUs;
determining that the candidate update code is compatible with existing code of the impacted ECUs based on consensus messages received from the plurality of impacted ECUs;
in response to the determination that the candidate update code is compatible with existing code of the impacted ECUs, allowing the candidate update code to be installed on the target ECU;
forming, by the validator node, a block containing information of the candidate update code and its installation disposition; and
appending the block to a blockchain utilized by one or more peer validator nodes.

16. The non-transitory computer readable medium of claim 15, wherein:
the impacted ECUs and the validator node are all nodes of a controller area network (CAN) of a vehicle; and
the CAN is one of multiple CANs, each CAN pertaining to a different vehicle subsystem and containing its own validator node and multiple ECUs pertaining to that subsystem as nodes on that CAN.

17. The non-transitory computer readable medium of claim 16, wherein the method further comprises:
assigning a universally unique identifier (UUID) to each of the ECUs in each of the CANs;
capturing, as ECU information, the dependencies and supplier details of each of the ECUs in each of the CANs; and
adding the UUID of each of the ECUs, in association with the corresponding ECU information, to the shared compliance ledger in a block of the blockchain.

18. The non-transitory computer readable medium of claim 15, wherein the method further comprises:
checking for known adverse conditions from a supplier of the target ECU using a respective uniform resource locator (URL) of the supplier which is stored in the blockchain.

19. The non-transitory computer readable medium of claim 15, wherein the method further comprises:
   storing the consensus decision in the blockchain.

20. The non-transitory computer readable medium of claim 19, wherein the method further comprises:
   forming, by the validator node, a block containing information of the impacted ECUs; and
   appending the block to the blockchain.

* * * * *